(12) United States Patent
Debbas

(10) Patent No.: US 6,554,515 B2
(45) Date of Patent: Apr. 29, 2003

(54) ERGONOMIC WRITING INSTRUMENT

(75) Inventor: Charles G. Debbas, Emeryville, CA (US)

(73) Assignee: Societe BIC S.A., Clichy (FR)

( * ) Notice: Subject to any disclaimer, the term of this patent is extended or adjusted under 35 U.S.C. 154(b) by 0 days.

(21) Appl. No.: 09/886,553

(22) Filed: Jun. 21, 2001

(65) Prior Publication Data
US 2002/0009323 A1 Jan. 24, 2002

Related U.S. Application Data
(60) Provisional application No. 60/213,306, filed on Jun. 22, 2000.

(51) Int. Cl.$^7$ .................................................. A46B 5/02
(52) U.S. Cl. ................................ 401/6; 16/430; D19/41
(58) Field of Search ...................... 401/6, 7, 9; 16/430; D19/41, 45, 47, 48

(56) References Cited

U.S. PATENT DOCUMENTS

| | | | | |
|---|---|---|---|---|
| 206,950 A | * | 8/1878 | Jeffery | 401/6 |
| 336,644 A | | 2/1886 | Hollwede | |
| 836,652 A | * | 11/1906 | Rosdahl | 401/6 |
| D110,810 S | * | 8/1938 | Kahn | 401/6 |
| D177,369 S | | 4/1956 | Ensign et al. | D74/20 |
| D177,370 S | | 4/1956 | Ensign et al. | D74/20 |
| D177,560 S | | 5/1956 | Ensign et al. | D74/17 |
| D189,170 S | * | 11/1960 | Lovejoy | 41/6 |
| D190,263 S | * | 5/1961 | Kaplan | 401/6 |
| D191,341 S | | 9/1961 | Fuchs | D74/24 |
| 3,338,217 A | | 8/1967 | Harrison | 120/98 |
| D212,919 S | | 12/1968 | Conley | D74/17 |
| D213,341 S | | 2/1969 | Fields | D74/17 |
| D256,925 S | | 9/1980 | Postrehovsky-Axel | D19/47 |
| D287,028 S | | 12/1986 | Thevenot | D19/51 |
| D323,350 S | | 1/1992 | Johansson | D19/49 |
| D359,508 S | | 6/1995 | Debbas | |
| 5,470,162 A | | 11/1995 | Rubin | |
| 5,626,430 A | | 5/1997 | Bistrack | |
| 5,893,671 A | | 4/1999 | Bellue | 401/6 |
| 6,149,333 A | | 11/2000 | Kershaw | |
| 6,174,098 B1 | | 1/2001 | Yeh | |
| 6,328,493 B1 | * | 12/2001 | Starchevich | 401/6 |

* cited by examiner

Primary Examiner—David J. Walczak
(74) Attorney, Agent, or Firm—Pennie & Edmonds LLP

(57) ABSTRACT

An ergonomic writing instrument has a writing section, a grasping section, and a stabilizing section. The writing instrument reduces stress and writing fatigue by providing the grasping section with a substantial thickness to keep users from clenching and a surface with a contour that essentially fits a portion of a hand, such as either the index finger or the middle finger of the left and right human hand or that essentially fits portions of both the index finger and middle finger. The grasping section is generally symmetrical about a plane essentially normal to the contoured surface so that the writing instrument can be used by either a right handed person or a left handed person.

26 Claims, 6 Drawing Sheets

ERGONOMIC WRITING INSTRUMENT

This application claims benefit of U.S. provisional application Ser. No. 60/213,306, filed on Jun. 22, 2000.

FIELD OF THE INVENTION

The present invention relates to ergonomic writing instruments, and more particularly to ergonomic writing instruments that fit portions of a human hand yet may be used by both right and left handed individuals.

BACKGROUND OF THE INVENTION

Numerous approaches have been taken over the years to develop writing instruments that provide a better grip to minimize problems from prolonged periods of handwriting such as writing fatigue and the formation of calluses; see, e.g., U.S. Pat. No. 5,228,794 issued Jul. 20, 1993 to Hochstetler, U.S. Pat. No. Des. 359,508 issued Jun. 20, 1995, U.S. Pat. No. 5,549,405 issued Aug. 27, 1996 to Krahn, U.S. Pat. No. 5,564,849 issued Oct. 15, 1996 to Greer, Jr. and U.S. Pat. No. 5,893,671 issued Apr. 13, 1999 to Bellue. One particularly effective solution is the ErgoPen® writing instrument, which is available from ErgoPen®, Inc. of Berkeley, Calif., and is now being sold under the Sheaffer® brand name available from BIC Corporation of Milford, Conn. The body of the ErgoPen® writing instrument is designed to comfortably fit and conform with the general structural features of the left or the right human hand. Unfortunately, having a body that is specific to right or left handed users increases manufacturing and inventory costs, and renders the writing instrument unsuitable for certain environments such as retail or banking where pens are put out for general public use.

SUMMARY OF THE INVENTION

The present invention provides a writing instrument that fits or conforms to portions of the human hand yet is suitable for use by both left and right handed individuals.

According to one embodiment of the present invention, a writing instrument is designed for use in either the right or left hand, the writing instrument having a generally elongated body comprising a writing section, a stabilizing section, and a grasping section. The grasping section is disposed between the writing section and the stabilizing section, and comprises a first surface, a second surface, and a third surface. The first surface and the second surface of the grasping section lie generally in a first plane and a second plane, respectively, and the first and second planes intersect one another about a plane of symmetry. The third surface is generally perpendicular to and generally symmetrical about the plane of symmetry, and further has a longitudinal contour for fitting one or more fingers, such as one of a group of finger types consisting of right and left index fingers, right and left middle fingers, and both right and left index fingers and right and left middle fingers.

Another embodiment of the present invention is a writing instrument having a body that is generally elongated along a longitudinal axis, comprising a writing section, a stabilizing section, and a grasping section. The longitudinal axis passes through at least portions of the writing section and the stabilizing section. The grasping section is disposed between the writing section and the stabilizing section, and has a first surface, a second surface, and a third surface lying generally in a first plane, a second plane, and a third plane, respectively. The first and second planes intersect one another about a plane of symmetry, and the third plane intersects the first and second planes and is perpendicular to the plane of symmetry and angled relative to the longitudinal axis.

BRIEF DESCRIPTION OF THE DRAWINGS

The detailed description will be better understood in conjunction with the accompanying drawings, wherein like reference characters represent like elements, such as follows.

DETAILED DESCRIPTION OF THE PREFERRED EMBODIMENTS

Figure 2:
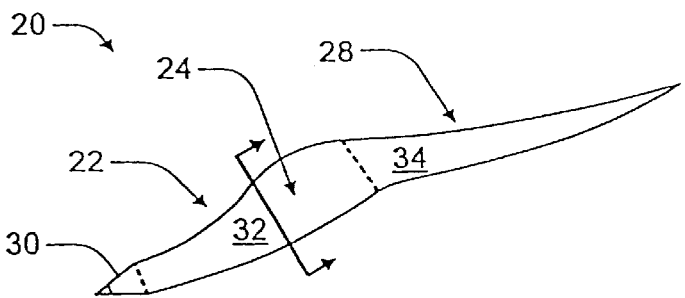
FIG. 2 is a pictorial diagram of a writing instrument in accordance with the present invention.

FIG. 2 is a pictorial diagram of a writing instrument 20 having a writing section 30, a grasping section 32, and a stabilizing section 34. Writing instrument 20 reduces stress and writing fatigue by providing grasping section 32 with a substantial thickness to keep users from clenching their grasp of writing instrument 20 and a surface 22 with a contour that essentially fits a portion of a hand, such as either the index finger or the middle finger of the human hand, or that essentially fits portions of both the index finger and middle finger. The grasping section 32 is generally symmetrical about a plane essentially normal to the contoured surface 22 so that the writing instrument 20 can be used by either a right handed person or a left handed person. Two examples of writing instruments similar to writing instrument 20 are illustrated in FIGS. 10 through 14 (first example) and FIGS. 15 through 19 (second example).

Figure 1:
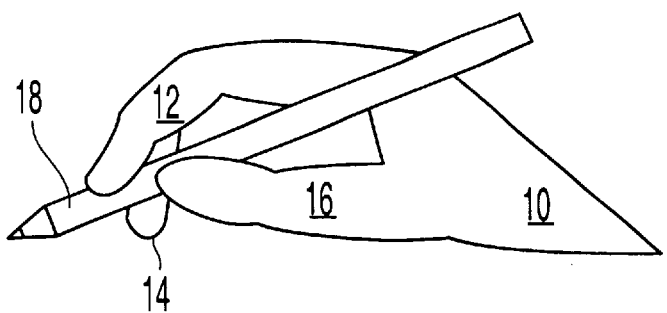
FIG. 1 is a pictorial diagram of a human hand holding a prior art writing instrument.
Figure 3:
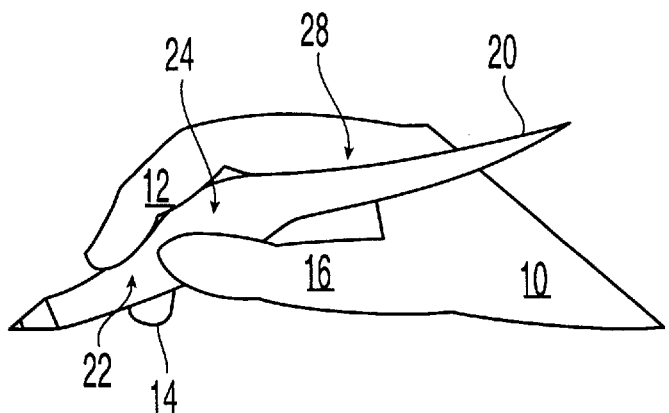
FIG. 3 is a pictorial diagram of a human hand holding a writing instrument in accordance with the present invention in a first way.
Figure 6:
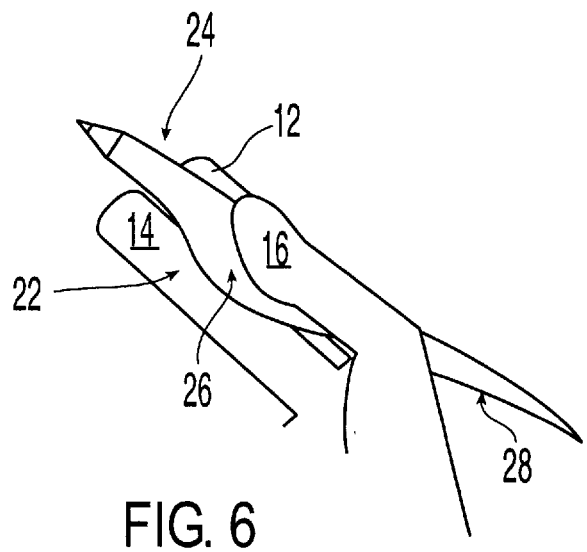
FIG. 6 is a pictorial diagram of a human hand holding a writing instrument in accordance with the present invention in a second way.
Figure 4:
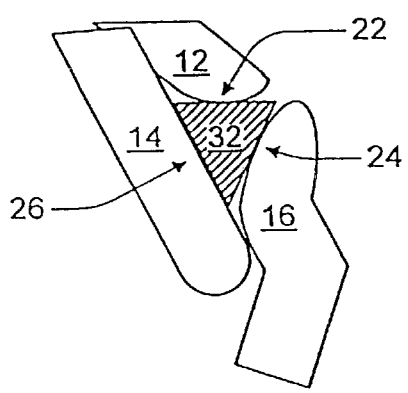
FIG. 4 is a cross-sectional view of the writing instrument of FIG. 2 showing how a right handed person holds the writing instrument in a first way.
Figure 5:
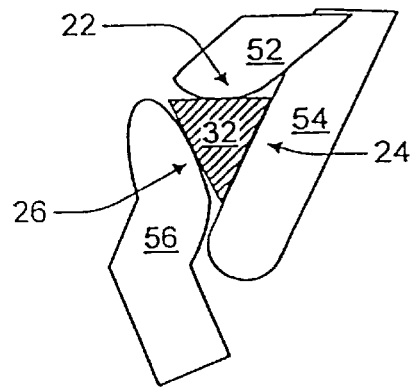
FIG. 5 is a cross-sectional view of the writing instrument of FIG. 2 showing how a left handed person holds the writing instrument in the first way.
Figure 7:
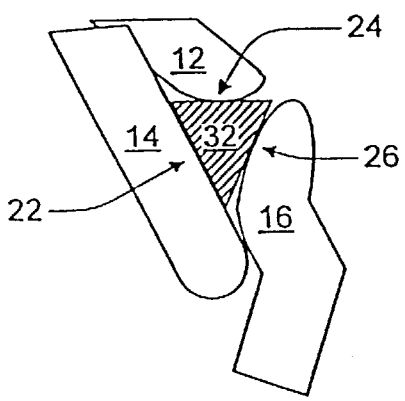
FIG. 7 is a cross-sectional view of the writing instrument of FIG. 2 showing how a right handed person holds the writing instrument in a second way.
Figure 8:
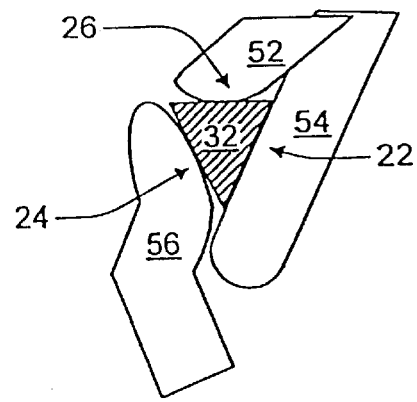
FIG. 8 is cross-sectional view of the writing instrument of FIG. 2 showing how a left handed person holds the writing instrument in the second way.

The writing instrument 20 may be held with contoured surface 22 against either index finger 12, as shown in FIG. 3, or against middle finger 14, as shown in FIG. 6. FIG. 3 shows contoured surface 22 contoured so that the inside surface of the tip segment of index finger 12, and for some users, the inside surface of middle segment of index finger 12, touch contoured surface 22. Right hand users grasp writing instrument 20 as shown in FIG. 4, with index finger 12 against contoured surface 22, thumb 16 against surface 24, and the edge of middle f finger 14 against surface 26. Left hand users grasp writing instrument 20 as shown in FIG. 5, with left index finger 52 against contoured surface 22, left thumb 56 against the surface 26, and the edge of left middle finger 54 against surface 24. FIG. 6 shows contoured surface 22 contoured so that the edge surface o f middle finger 14 at the joint between the tip and middle segments, the edge surface of the tip segment, the edge surface of the middle segment, or some combination thereof touch contoured surface 22. Right hand users grasp writing instrument 20 as shown in FIG. 7, with middle finger 14 against contoured surface 22, thumb 16 against surface 26, and index finger 12 against surface 24. Left hand users grasp writing instrument 20 as shown in FIG. 8, with left middle finger 54 against contoured surface 22, left thumb 56 against surface 24, a and left index finger 52 against surface 26.

Additionally, stabilizing section 34 comprises a surface 28 against which the user's hand may rest to stabilize writing instrument 20. Surface 28 may comprise a generally convex longitudinal portion. It is to be understood that stabilizing section 34 may be any shape such as an elongated tail, and any length, which accomplishes this stabilization.

Because the human hand occurs in a n enormous variety of different shapes and sizes, the thickness of grasping section 32 and the contour of contoured surface 22 may be generalized to fit both the index finger and the middle finger over certain ranges of shapes and sizes. As a practical matter, preferably several different writing instruments with grasping sections of different thickness and with different contours for the fitted surfaces thereof are desirable for the different ranges of common hand shapes and sizes. It will be appreciated that, if d desired, the thickness of grasping section 32 and the contour of contoured surface 22 may be optimized for either the index finger or the middle finger and for a particular hand size and shape.

Figure 9:
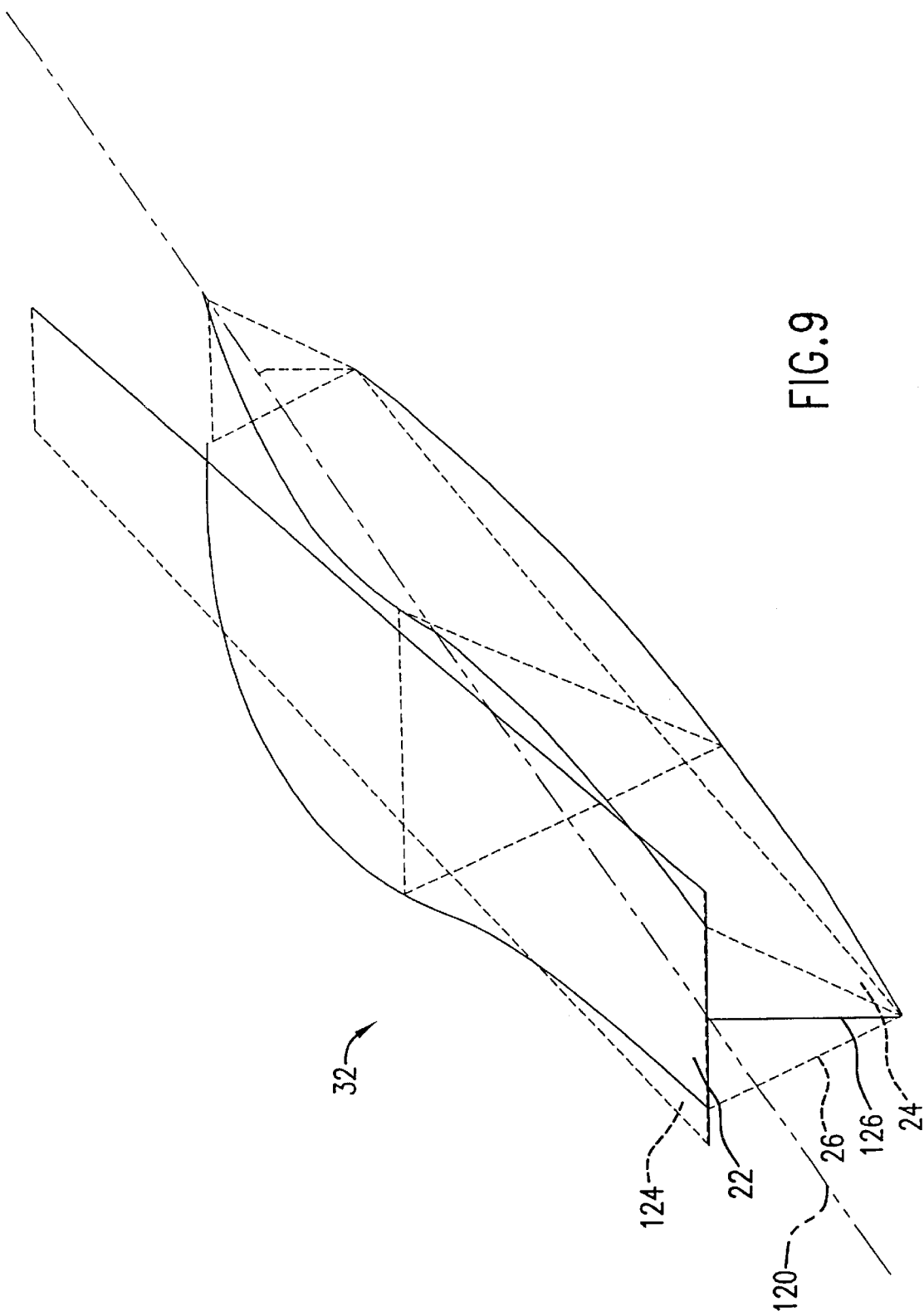
FIG. 9 is a wire frame diagram of the gripping section of the writing instrument of FIG. 2 showing various planes for purposes of explanation.

FIG. 9 is a wire frame diagram of grasping section 32 of the writing instrument of FIG. 2. Contoured surface 22 and surface 24 are visible. Surface 26 is hidden but preferably is a mirror image of surface 24. An axis and two planes are shown for purposes of explanation. Axis 120 is a longitudinal axis representing the longitudinal extent of writing instrument 20. The two planes are a plane of symmetry 126 and a plane 124 normal thereto.

Whether contoured surface 22 has a simple or complex contour, it can be envisioned as lying generally about plane 124. Since the part of contoured surface 22 extending towards stabilizing section 34 protrudes more than the part of contoured surface 22 extending towards writing section 30, plane 124 in which at least a portion of contoured surface 22 is envisioned to lie can be thought of as being slightly angled relative to longitudinal axis 120. So as to feel the same to a left or right handed person, contoured surface 22 can be envisioned as being intersected by and symmetrical about the plane of symmetry 126 (intersection only partly shown in FIG. 12 to maintain clarity). Surfaces 24 and 26 may also be envisioned as lying generally about respective planes (not shown) which intersect one another on the plane of symmetry and are symmetrical about the plane of symmetry 126 so that writing instrument 20 feels the same to a left or right handed person.

If stabilizing section 34 is considered to be an extension of grasping section 32, then the description of contoured surface 22 is equally applicable to surface 28. Surface 28 of stabilizing section 34 may also be envisioned as lying generally in its respective plane. This plane intersects the respective planes of surfaces 24 and 26, and is perpendicular to the plane of symmetry, but not necessarily coplanar or parallel to plane 124.

It will be appreciated that while contoured surface 22 and surfaces 24, 26, and 28 are preferably symmetrical about the plane of symmetry 126, minor variations away from symmetry are tolerable, provided that they do not affect the usefulness of writing instrument 20 to both right and left handed persons. It will also be appreciated that surfaces 22, 24, 26, and 28 need not necessarily meet one another directly, and that certain transition surfaces, such as chamfers, may be used if desired for aesthetic purposes or other functional purposes.

Figure 10:
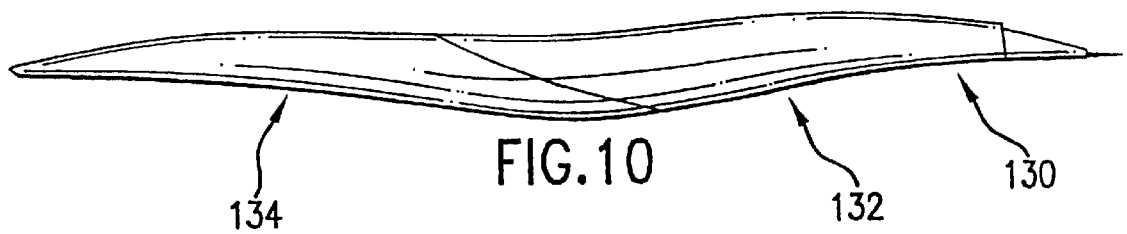
FIG. 10 is a side elevational view of a writing instrument in accordance with the present invention, a plane of symmetry being parallel to the drawing sheet.
Figure 11:
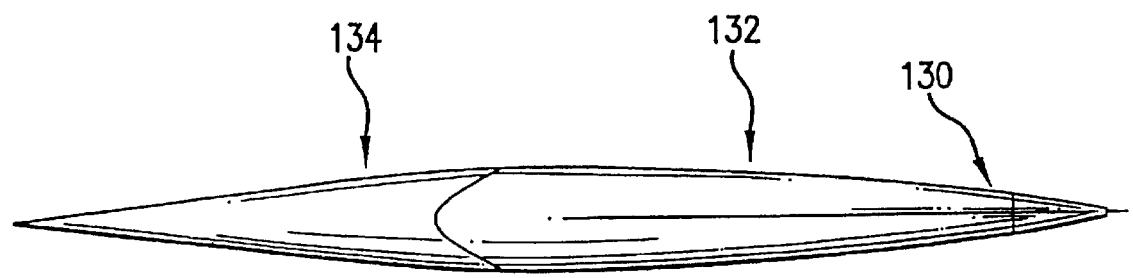
FIG. 11 is a top elevational view of the writing instrument of FIG. 10, the plane of symmetry being normal to the drawing sheet.
Figure 12:
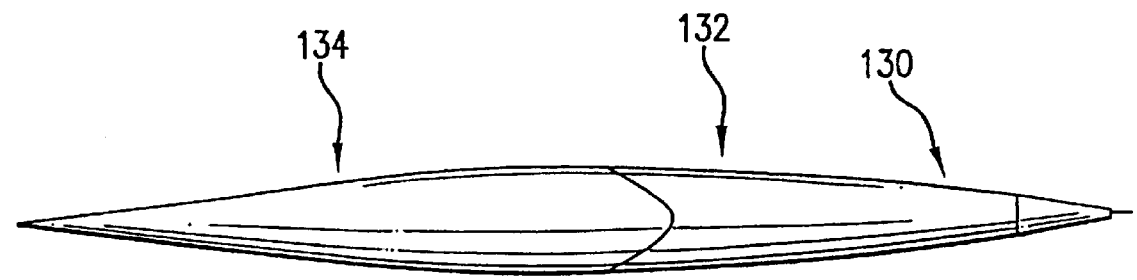
FIG. 12 is a bottom elevational view of the writing instrument of FIG. 10, the plane of symmetry being normal to the drawing sheet.
Figure 13:
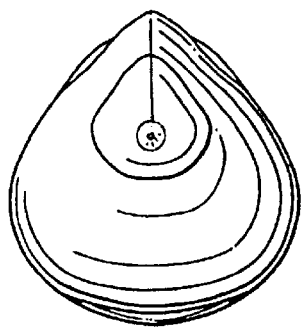
FIG. 13 is a front elevational view of the writing instrument of FIG. 10, the longitudinal axis of the writing instrument being normal to the drawing sheet.
Figure 14:
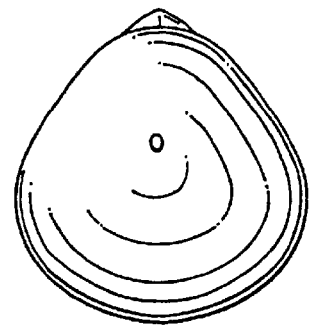
FIG. 14 is a rear elevational view of the writing instrument of FIG. 10, the longitudinal axis of the writing instrument being normal to the drawing sheet.
Figure 15:
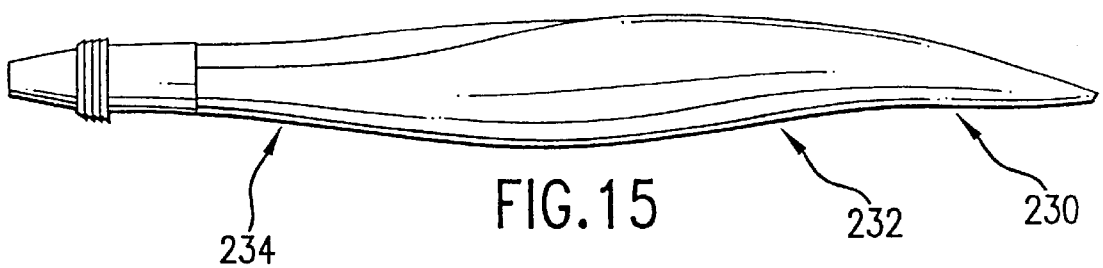
FIG. 15 is a side elevational view of another writing instrument in accordance with the present invention, a plane of symmetry being parallel to the drawing sheet.
Figure 16:
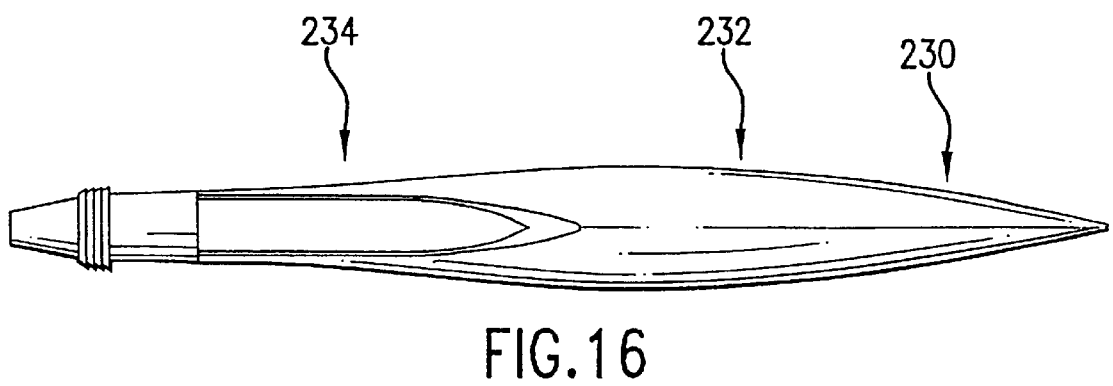
FIG. 16 is a top elevational view of the writing instrument of FIG. 15, the plane of symmetry being normal to the drawing sheet.
Figure 17:
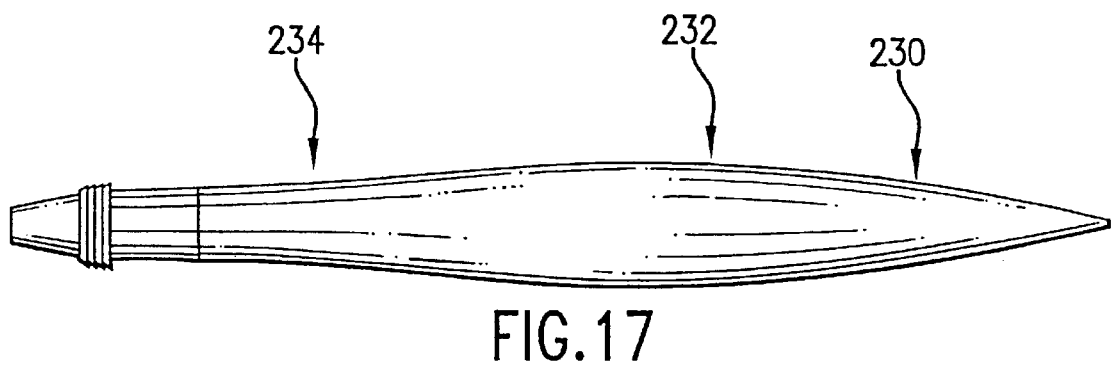
FIG. 17 is a bottom elevational view of the writing instrument of FIG. 15, the plane of symmetry being normal to the drawing sheet.
Figure 18:
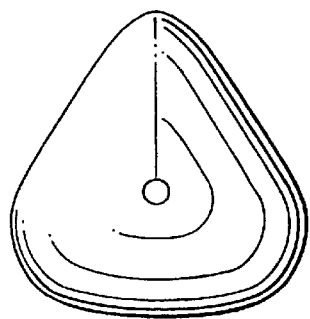
FIG. 18 is a front elevational view of the writing instrument of FIG. 15, the longitudinal axis of the writing instrument being normal to the drawing sheet.
Figure 19:
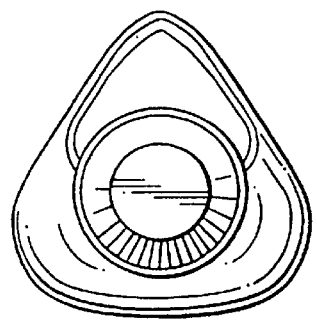
FIG. 19 is a rear elevational view of the writing instrument of FIG. 15, the longitudinal axis of the writing instrument being normal to the drawing sheet.
Figure 20:
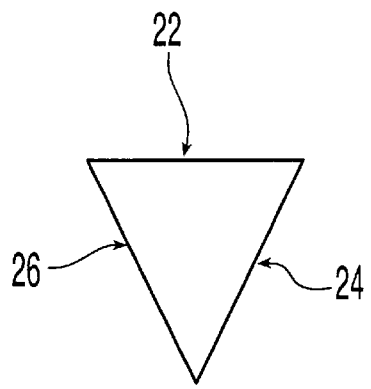
FIGS. 20–28 are cross-sectional views through the gripping section of a writing instrument in accordance with the present invention, showing various possible transverse surface contours.
Figure 21:
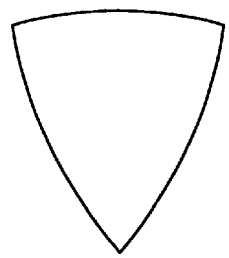
Figure 22:
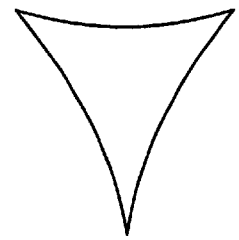
Figure 23:
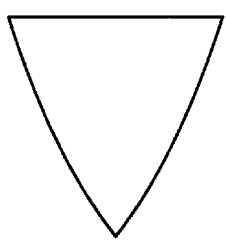
Figure 24:
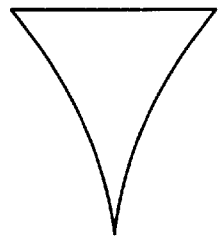
Figure 25:
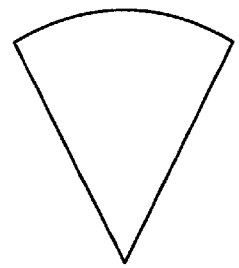
Figure 26:
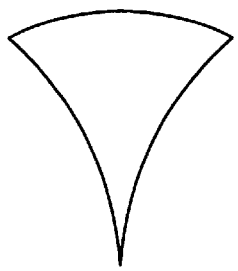
Figure 27:
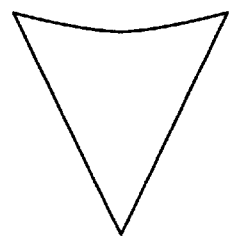
Figure 28:
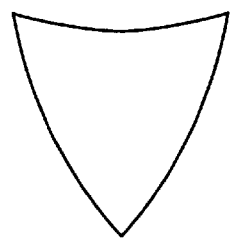

Two examples of writing instruments similar to writing instrument 20 in having a grasping section which includes a fitted surface and which is symmetrical about a plane are shown in elevation in FIGS. 10 through 14 (first example) and FIGS. 15 through 19 (second example). Regarding the first example of a writing instrument, FIG. 10 is a side elevation view of a writing instrument with the plane of symmetry being parallel to the drawing sheet, FIGS. 11 and 12 are top and bottom elevation views with the plane of symmetry being normal to the drawing sheet, and FIGS. 13 and 14 are front and rear elevation views with an axis of the writing instrument being normal to the drawing sheet. Regarding the second example of a writing instrument, FIG. 15 is a side elevation view of a writing instrument with the plane of symmetry being parallel to the drawing sheet, FIGS. 16 and 17 are top and bottom elevation views with the plane of symmetry being normal to the drawing sheet, and FIGS. 18 and 19 are front and rear elevation views with an axis of the writing instrument being normal to the drawing sheet. It will be appreciated that the terms "top," "bottom," "side," "front" and "rear" are relative terms useful for explanation, and are not intended to suggest any particular orientation of the writing instrument. As shown most clearly in the elevations of FIGS. 10 through 12 (first example) and FIGS. 15 through 17 (second example), the thickness of the grasping section 132 for the writing instrument of FIG. 10 and the grasping section 232 for the writing instrument of FIG. 15 preferably is variable, being less thick toward the writing sections 130 and 230 respectively, and progressively thickening toward the stabilizing sections 134 and 234. Although the grasping sections 32, 132, and 232 may be made a constant thickness if desired, the progressively varying thickness is preferred because it allows for some individual differences in hand size and shape. The writing instruments of FIGS. 10 and 15 are about six inches in length, with the other dimensions being shown approximately proportional to the length in FIGS. 10 through 12 for the first example, and in FIGS. 15 through 17 for the second example.

Surfaces 22, 24, 26, and 28 may have various contours. While contoured surface 22 has a valley contour toward writing section 30 and a hill contour toward stabilizing section 34, contoured surface 22 may instead have planar features such as a ramp, for example. Similarly, surface 28 may have such planar features as a ramp. Transverse contours may be linear, concave, or convex, and these may be mixed for the surfaces 22, 24, 26, and 28 as shown in FIGS. 20–28 or otherwise as desired. For clarity, surfaces 22, 24, and 26 are only referenced in FIG. 20.

Writing section 30 may include a ball point ink cartridge, a mechanical pencil, mechanism, an inked felt or plastic cartridge, a fountain pen tip, or any other type of marking device or substance. Alternatively, writing section 30 may include a nub for using writing instrument 20 as a stylus for writing and tapping on pressure sensitive screens such as, for example, a personal digital assistant such as the Palm III™ V™ or VII™ connected organizers available from Palm Computing, Inc. of Santa Clara, Calif.

Any suitable material, including plastic, wood, aluminum, or combinations thereof, may be used for the body of writing instrument 20. Grasping section 32 may be provided with a non-slip type of surface finish or be encased in a thin sheet of rubber or soft plastic to prevent slippage during use. The body of writing instrument 20 may include a clip if desired, and a cap may be provided for writing section 30 if desired.

The description of the invention and its applications as set forth herein is illustrative and is not intended to limit the scope of the invention as set forth in the following claims. Variations and modifications of the embodiments disclosed herein are possible, and practical alternatives to and equivalents of the various elements of the embodiments are known to those of ordinary skill in the art. For instance, it will be clear to those skilled in the art that the present invention may be embodied in other forms, structures, arrangements, proportions, and with other elements, materials, and components, without departing from the spirit or essential characteristics thereof. These and other variations and modifications of the embodiments disclosed herein may be made without departing from the scope and spirit of the invention as set forth in the following claims.

What is claimed is:

1. A writing instrument for use in either the right or left hand, said writing instrument having a generally elongated body comprising:
   a first end;
   a second end;
   a writing section disposed at said first end; and
   a grasping section disposed between said writing section and said second end, said grasping section comprising a first surface, a second surface, and a third surface, said first surface and said second surface lying generally in a first plane and a second plane respectively, said first and second planes intersecting one another about a plane of symmetry, and said third surface being generally perpendicular to and generally symmetrical about said plane of symmetry;
   wherein said third surface further has a longitudinal curved contour for fitting a part of a hand.

2. A writing instrument as in claim 1, wherein said longitudinal contour of said third surface comprises a generally concave longitudinal portion disposed toward said writing section and a generally convex longitudinal portion disposed toward said second end.

3. A writing instrument for use in either the right or left hand, said writing instrument having a generally elongated body comprising:
   a writing section;
   a stabilizing section; and
   a grasping section disposed between said writing section and said stabilizing section, said grasping section comprising a first surface, a second surface, and a third surface, said first surface and said second surface lying generally in a first plane and a second plane respectively, said first and second planes intersecting one another about a plane of symmetry, and said third surface being generally perpendicular to and generally symmetrical about said plane of symmetry;
   wherein said third surface further has a longitudinal contour for fitting a part of a hand; and
   wherein said stabilizing section comprises a fourth surface lying generally in a fourth plane and being generally perpendicular to and generally symmetrical about said plane of symmetry.

4. A writing instrument as in claim 3, wherein said fourth surface is not co-planar with said third surface.

5. A writing instrument as in claim 3, wherein said fourth plane intersects said first and second planes.

6. A writing instrument as in claim 3, wherein said fourth surface extends from said third surface.

7. A writing instrument as in claim 3, wherein:
   said longitudinal contour of said third surface comprises a generally concave longitudinal portion disposed toward said writing section and a generally convex longitudinal portion disposed toward said stabilizing section; and
   said fourth surface comprises a generally convex longitudinal portion.

8. A writing instrument as in claim 3, wherein:
   said longitudinal contour of the third surface is generally planar; and
   said fourth surface is generally planar.

9. A writing instrument as in claim 3, wherein said stabilizing section comprises an elongated tail.

10. A writing instrument as in claim 1, wherein said writing section comprises an inked tip.

11. A writing instrument as in claim 1, wherein said writing section comprises a stylus tip.

12. A writing instrument as in claim 1, wherein said third surface has a longitudinal contour for fitting one of a group of finger types consisting of right and left index fingers, right and left middle fingers, and both right and left index fingers and right and left middle fingers.

13. A writing instrument having a body that is generally elongated along a longitudinal axis, said writing instrument comprising:

a writing section;

a stabilizing section, said longitudinal axis passing through at least portions of said writing section and said stabilizing section; and a grasping section disposed between said writing section and said stabilizing section, said grasping section having a first surface, a second surface, and a third surface lying generally in a first plane, a second plane, and a third plane respectively, said first and second planes intersecting one another about a plane of symmetry, and said third plane intersecting the first and second planes and being perpendicular to said plane of symmetry and angled relative to said longitudinal axis to increase the thickness of said grasping section to keep a user from clenching the grasp of said writing instrument.

14. A writing instrument as in claim 13, wherein said first and second planes intersect one another along a line lying in said plane of symmetry.

15. A writing instrument as in claim 13, wherein said third surface comprises a generally concave longitudinal portion disposed toward said writing section and a generally convex longitudinal portion disposed toward said stabilizing section.

16. A writing instrument as in claim 13, wherein said third surface is generally planar.

17. A writing instrument as in claim 13, wherein said stabilizing section comprises a fourth surface lying generally in a fourth plane, said fourth plane being perpendicular to said plane of symmetry and intersecting said first and second planes.

18. A writing instrument as in claim 17, wherein:

said third surface comprises a generally concave longitudinal portion disposed toward said writing section and a generally convex longitudinal portion disposed toward said stabilizing section; and said fourth surface comprises a generally convex longitudinal portion.

19. A writing instrument as in claim 17, wherein:

said third surface is generally planar; and said fourth surface is generally planar.

20. A writing instrument as in claim 13, wherein said stabilizing section comprises an elongated tail.

21. A writing instrument as in claim 13, wherein said writing section comprises an inked tip.

22. A writing instrument as in claim 13, wherein said writing section comprises a stylus tip.

23. A writing instrument as in claim 1, wherein said longitudinal contour of said third surface is sized to fit the contour of at least one entire finger.

24. A writing instrument as in claim 1, wherein:

said first surface has a longitudinal contour;

said second surface has a longitudinal contour; and said longitudinal contour of said third surface is different from said longitudinal contours of said first and second surfaces.

25. A writing instrument as in claim 1, wherein said grasping section has a thickness greater than said second end.

26. A writing instrument having a body that is generally elongated along a longitudinal axis, said writing instrument comprising:

a writing section;

a stabilizing section, said longitudinal axis passing through at least portions of said writing section and said stabilizing section; and a grasping section disposed between said writing section and said stabilizing section, said grasping section having a first surface, a second surface, and a third surface lying generally in a first plane, a second plane, and a third plane respectively, said first and second planes intersecting one another about a plane of symmetry, and said third plane intersecting the first and second planes and being perpendicular to said plane of symmetry and angled relative to said longitudinal axis;

wherein the angle between said third plane and said longitudinal axis is different from the angle between said first plane and said longitudinal axis and the angle between said second plane and said longitudinal axis.

* * * * *